No. 872,340. PATENTED DEC. 3, 1907.
G. F. GREENE.
COTTON PICKER.
APPLICATION FILED SEPT. 7, 1905.
3 SHEETS—SHEET 1.
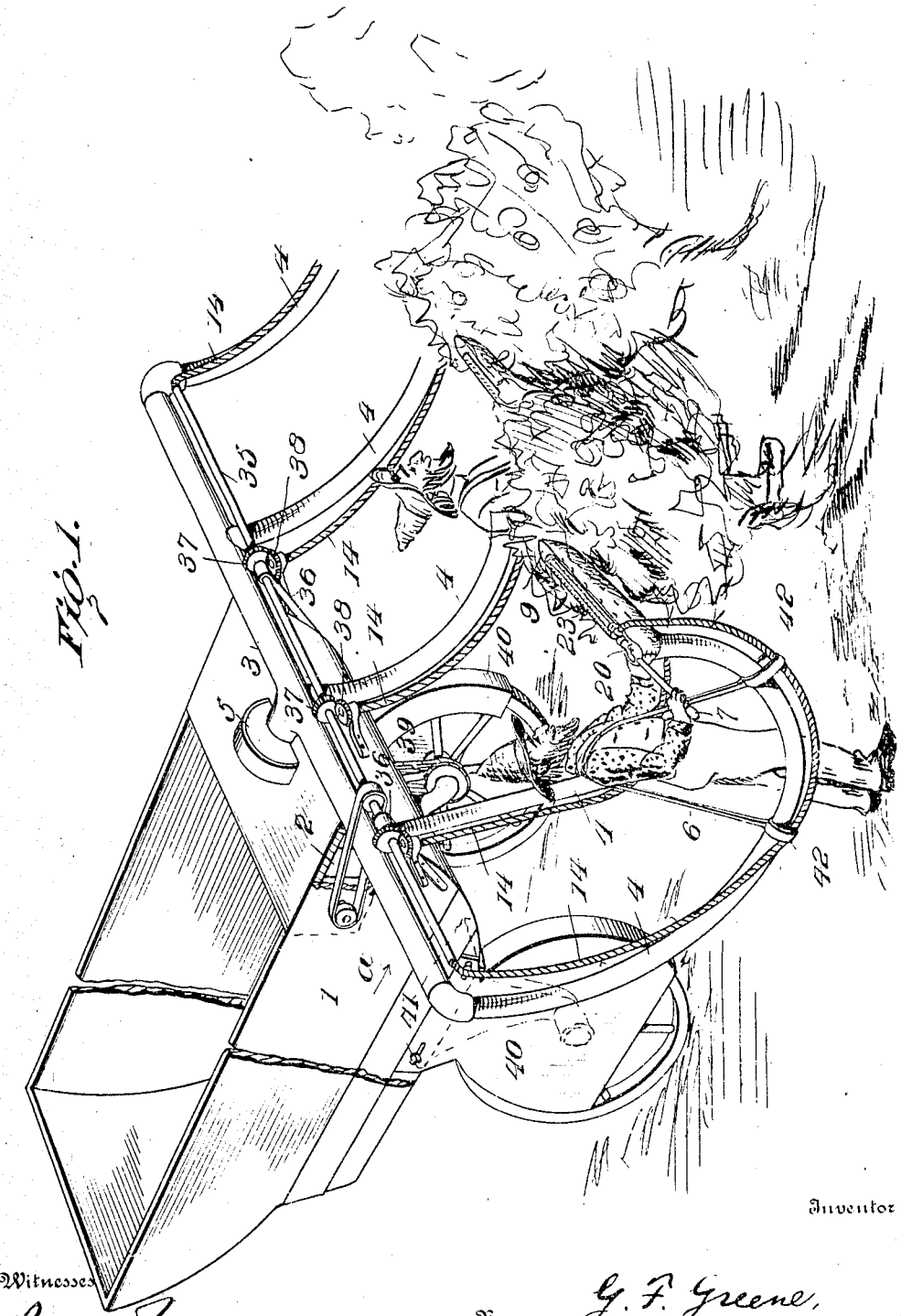
Witnesses
Jno Thomas
E. Bradley
Inventor
G. F. Greene,
By
Benj. R. Catlin Attorney

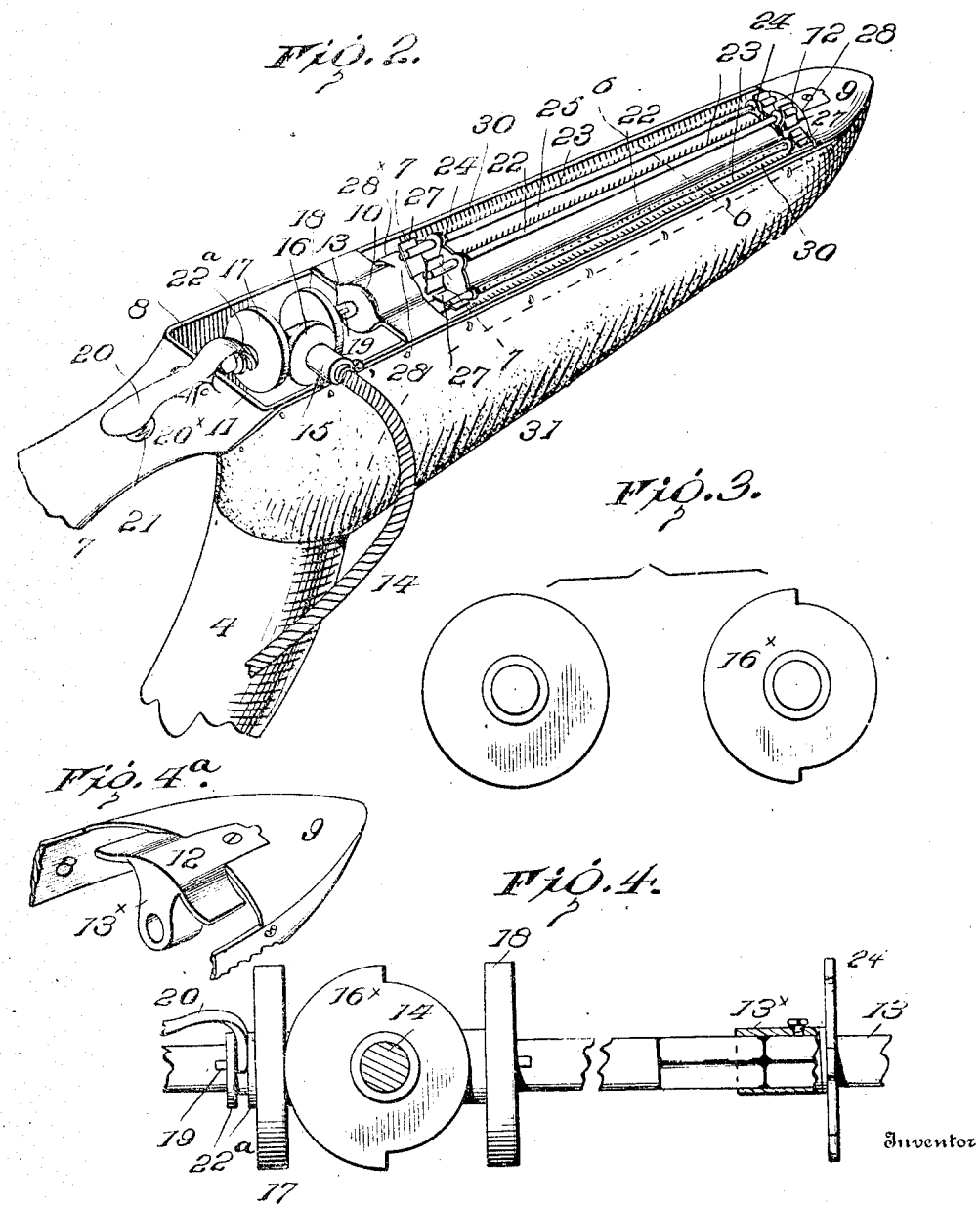

No. 872,340. PATENTED DEC. 3, 1907.
G. F. GREENE.
COTTON PICKER.
APPLICATION FILED SEPT. 7, 1905.
3 SHEETS—SHEET 3.
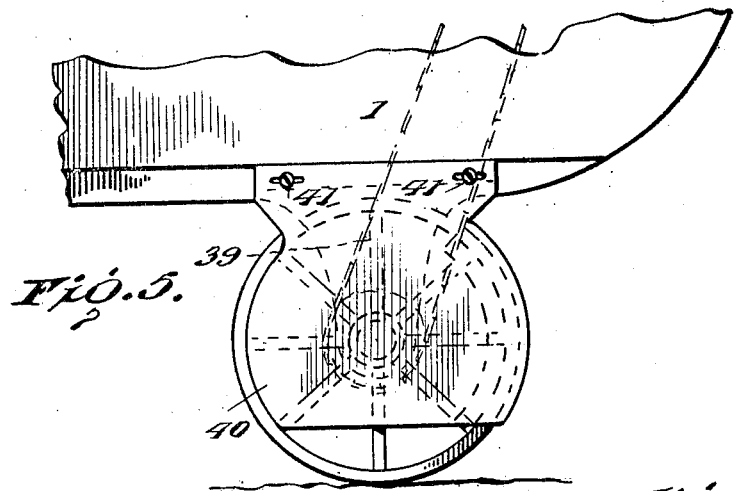
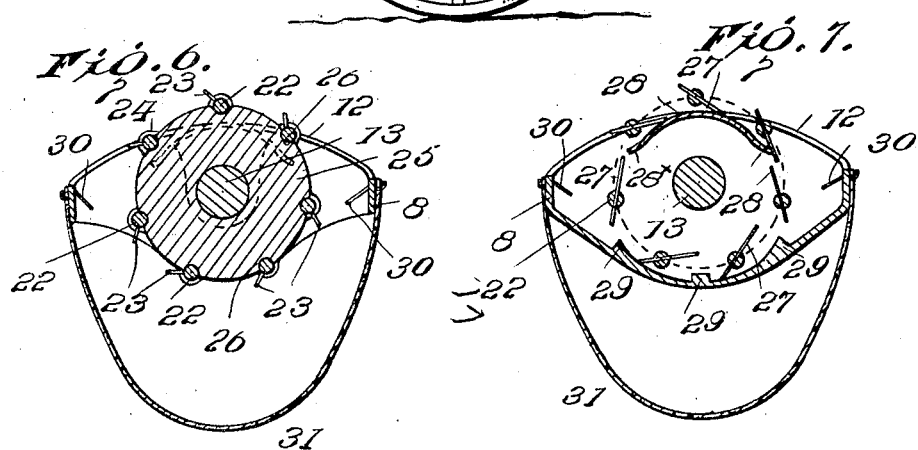
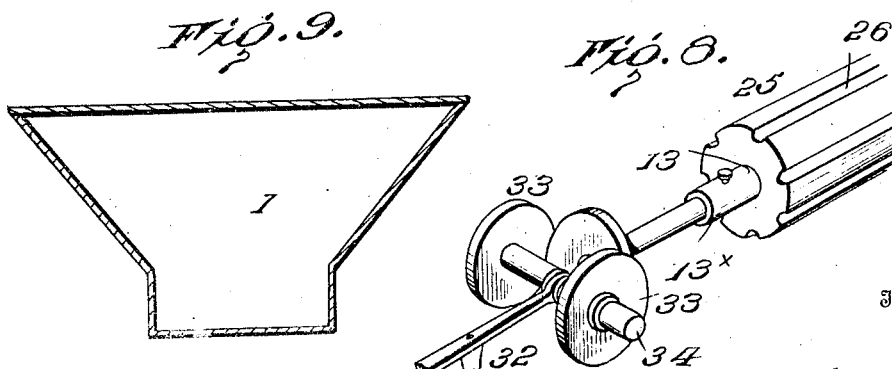

UNITED STATES PATENT OFFICE.

GILBERT F. GREENE, OF WASHINGTON, DISTRICT OF COLUMBIA.

COTTON-PICKER.

No. 872,340.  Specification of Letters Patent.  Patented Dec. 3, 1907.

Application filed September 7, 1905. Serial No. 277,388.

*To all whom it may concern:*

Be it known that I, GILBERT F. GREENE, a resident of Washington, District of Columbia, have invented certain new and useful Improvements in Cotton-Pickers; and I do hereby declare the following to be a full, clear, and exact description of the invention, such as will enable others skilled in the art to which it pertains to make and use the same.
This invention relates to mechanism for harvesting cotton and has for its object to provide simple and efficient devices for economically picking and receiving the cotton.

The invention consists in the construction hereinafter described and pointed out.

In the accompanying drawings which form a part of this specification,—Figure 1 is a partial perspective of a cotton carrier or vehicle provided with a cotton-conveying-tube for connection with the improved pickers sufficient to pick a plurality of rows; Fig. 2 is a similar view, on a larger scale, of a picker; Fig. 3 is a side view of two friction disks; Fig. 4 is a side view of a reversing means;
Fig. 4ª shows a bearing for one end of the picker shafts; Fig. 5 is a side view of a wheel guard; Figs. 6 and 7 are sections on lines 6, 6 and 7, 7 of Fig. 2; Fig. 8 is a partial perspective view of a reversing device; Fig. 9 is a cross section of a preferred form of wagon body.

Numeral 1 denotes a carrier or vehicle of any preferred or approved kind, driven preferably by a motor indicated at 2 and in the direction of the arrow $a$, in which case it travels only over or among picked plants. It would however be operative with the improved devices if driven or drawn oppositely, that is over the unpicked cotton which in such case would be picked at the rear end of the cart, wagon, or other vehicle or carrier. The improvement is not limited in this respect nor in respect to the kind of motive power, nor to the number of cotton-receiving and conveying tubes each connected to a picker.

Numeral 3 denotes the main conveying tube and 4 its receiving branches. This tube system is by preference operatively connected with a suction fan 5. The number of pickers and corresponding branch tubes may be varied. Five is a convenient number. This provides for simultaneously picking ten rows, each operator picking two. The wagon straddles a row and the machine provides for picking a plurality of rows outside its path. It might be made to straddle a plurality of rows.

The branch-cotton-receiving-tubes are preferably flexible and provided with means such as straps 6 whereby they may be conveniently supported from the operator's person.

7 denotes a handle fixed to a picker-spindle-supporting frame 8 having a pointed nose 9 and transverse parts 10, 11 and 12 which afford suitable bearings for the picker spindle 13. This frame is conveniently made of sheet metal but cast metal or wood could be used.

The picker spindle has a removable section normally held in connection with the gear wheel section by a slidable sleeve $13^\times$, Fig. 4 and is driven by a flexible shaft 14 suitably connected to the motor. Said shaft has a bearing at 15 and is provided with a friction disk 16 operatively situated with respect to the friction disks 17 and 18 of a spool connected by a spline 19 with the spindle. By this construction the direction of the rotation of the spindle can be reversed without reversing that of the driving shaft.

20 is a shifter or reversing lever having a fulcrum at $20^\times$ and combined with a returning spring 21. This shifting device has a claw embracing the spindle between two collars $22^a$ fixed to the described spool. The end of said shifter contiguous disk 17 of the spool is so shaped as to press against it and move it toward the forward end of the spindle thereby putting disk 17 in operative contact with the driving disk 16. On releasing the shifter the spring $20^\times$ returns it and the spool to their normal positions, in which disk 18 is in situation to be driven by the disk 16. By these means the spindle can be driven in either direction at will. In some cases it may be desirable to effect such reversal automatically and for this a friction disk $16^\times$ such as shown in Fig. 3 having a part of its periphery cut away may be substituted for the circular disk 16 and these disks may be made interchangeable. In this case part 20 is a mere holding device for the spool and not a shifting device.

Upon the picker spindle are supported a plurality of rods 22 each provided with a cotton-gathering brush or the like indicated at 23 and rotatably held in suitable bearings. In the present instance these are provided in metal disks 24 fixed to the ends of a wooden cylinder 25 which has grooves 26 to receive the rods as shown. The use of this cylinder whether made of wood or other material is not essential to other parts of the improvement. Such cylinder however furnishes firm support for the rods 22 and excludes the lint which might be collected by an open frame.

The rods 22 are extended outside the bearings in disks 24 and provided with reversing wings 27. Normally the trailing wings bear on a suitable plate or bearing surface 28 and the brushes are thereby held in situation to pick cotton. But they pass off said surfaces and off the spring portions 28* thereof adjacent wing-reversing stops 29 on either side according to the direction of rotation so that the forward wings caused to engage said stops by the rotation of the spindle and its disks are held and together with the rods and brushes are successively reversed in position, and in such manner that the brush bristles or teeth are drawn from the picked cotton by the continued rotation of the brush-supporting frame and the co-action of stripping-teeth 30 or the like. These are any approved kind and incline downwardly toward and nearly to the path of the brush whereby bolls and leaves accidentally picked from the bush may be retained above the teeth and thrown off above by the reaction of the teeth when relieved from the pressure caused by the brush carrying picked cotton. They hold picked cotton in a yielding manner against the pressure of the brush until the latter is in position to be stripped. Cotton thus picked is dropped into a sack 31 detachably connected to the open bottom of the frame 8 by hooks, or other fastenings permitting easy disengagement. This sack communicates with a branch conduit 4 and its receipts are drawn by the fan into the wagon body. The improvements in the picker proper however are not limited to a combination with a fan or equivalent nor to the use of the described system of collecting tubes since said picker would be operative were cotton discharged from it by gravity.

The picker-supporting frame having the handle and nose provides for easy and efficient manipulation and the sack provides for the collection of the picked cotton. The reversible brushes facilitate the discharge of the picked cotton. The reversible spindle and brush frame provide for picking at either the right or left hand side. This is specially useful in picking pendent bolls which being moved laterally by the action of a brush or brushes to remove cotton on one side thereof can be returned and picked on the opposite side by merely changing the direction of the rotation of the spindle. The advantage of simultaneously picking a considerable plurality of rows is secured by the construction, several rows being by preference in practice entirely outside the wagon path.

It will be understood that each picker has a driving shaft and conveying tube and that these by preference are connected to the spindle-supporting frame near the rear end of the frame in front of the handle and between said handle and the picking devices proper

The frame is open on its upper side to permit the picking operation, and has on its under side a receiver which is preferably a sack extending the full length of the picker. So far as the main improvements and operation are concerned the invention would not be avoided by mechanical variations in the structure such as the provision of an integral frame and handle, or the making of these parts of wire, sheet metal, wood or other materials, or the use in what may be called the cotton picking brush of bristles, wires, fingers, springs or any known equivalent. No suitable means for securing or collecting the cotton from the individual pickers are excluded, and it is obvious that the particular situation of the returning spring is immaterial and that it is only important that means be provided for suitably reversing the operation of the friction gear or other equivalent means for transmitting power.

The handle as indicated is made in form and size to adapt it for use by both hands of the operator and the picker can be readily thrust into every part of a bush and in many cases, as when the growth is good and the crop matured, without aiming at particular bolls. The picker-driving shafts are by preference arranged contiguous the cotton-collecting tube-branches, at least at their lower part, and a strap 42 may be supplied to prevent their accidental separation to an inconvenient extent.

My improvement is designed for the picking of two rows on each side thereof by a laborer walking between them. This is effected by simply passing the picker from one side to the other of the cotton bushes both on the right and left hand side. To enable this to be done the picker is made similar and operative on each side and is made reversible and provided with a handle for its convenient manipulation.

I am aware that pickers with handles have been proposed, but in none known to me has a picking device with two similar and practically parallel and operative sides been combined with means for reversing, and with a handle substantially as herein set forth, whereby the proximate sides of two rows and also their remote sides can be picked, and whereby also the picker can be thrust endwise in the midst of a bush and there held and picking effected on both sides thereof within the bush.

In Fig. 8 is shown a modification of the spindle reversing devices in which 32 denotes the reversing lever and 33 disks fixed on an endwise shiftable driving shaft 34. It is obvious that such construction would operate substantially as that before described and would secure like advantages. Not only does the reversal of the brush during the rotation of its spindle-support facilitate withdrawal of the brush bristles or teeth from the cotton, but it relieves the cotton just picked by it, from pressure toward the teeth 30 and if a boll has been pulled down by the brush it is released. In such case the spring teeth 30 tend to throw it up and if it be broken from the bush it will drop to the ground. If the spindle be reversed when a boll or other obstruction rests above teeth 30 the next brush moving upward will remove it.

In Fig. 1 is shown a suitable arrangement of the spindle-driving shafts. 35 denotes a shaft supported to turn in bearings provided in brackets 36 and driven by any desired form of motor and motor connections. It is provided with gears 37 meshing with gears 38 having bearings in said brackets 36 and fixed to the flexible shafts. The gear-supporting brackets preferably extend laterally from the wagon body. The latter can be made as wide at the top as desired, but will preferably be contracted at the bottom to avoid serious interference with the cotton bushes. The wheels can be made of comparatively small diameter to run under the bushes and can be supported to turn on brackets 39 fixed to the body, thus avoiding the use of axle-trees or other transverse parts beneath the body. To obviate the catching of limbs by the wheel spokes, shields 40 are secured to the body over the wheels. The screws 41 or other fastenings provide for temporarily removing the shields. The wagon body having its end inclined as indicated in Fig. 9 is adapted to be moved over the top of a row without breaking it down and in general the body having the contracted bottom combined with wheels supported from its sides, having comparatively small diameter, and adapted to fend off bush branches, affords a construction specially suitable for gathering cotton.

Having described the invention what I claim is—

1. A cotton picker having a reversible spindle, a brush supported on the spindle, a motor to operate said spindle, connecting mechanism, and means for reversing the direction of the spindle at any period in its movement.

2. A cotton picker having a reversible spindle, a motor to rotate said spindle, connecting mechanism, means for reversing the direction of the spindle at any period in its movement, a reversible brush supported on the spindle, and means for automatically reversing the brush independently of the support-reversing-means.

3. A cotton picker having a reversible brush support, mechanism to reverse it, a brush pivoted on said support, and means to automatically reverse the brush said means comprising parts fixed to the support and brush.

4. In a cotton picker, a reversible rotating spindle, a plurality of oscillating brushes pivoted thereon, means whereby said brushes pick cotton irrespective of the direction of rotation of the spindle, devices for reversing the spindle at will, and means for causing the brushes to oscillate independently of the direction of the rotary movement of the spindle.

5. In a cotton picker, the single rotatable spindle, means for reversing the direction of its rotation, a brush pivotally supported from the spindle, co-acting stripping teeth situated normally at the side of the brush holder and co-extensive lengthwise therewith, and means for receiving the picked cotton whatever the direction of the spindle rotation.

6. A cotton picker consisting of a single brush-carrying rotatable spindle, a spindle supporting frame, a frame support, flexible connections suspending the frame from its support, a frame handle, means for reversing at will the direction of the rotation of said spindle independently of the handle, and a plurality of oscillating brushes pivotally supported from the spindle and parallel thereto, combined with means for holding a part of the brushes on each side of a plane passing through the spindle axis in an operative situation to pick cotton, and with means whereby the brushes are automatically turned each on its pivot to withdraw it from the picked cotton without reversing the spindle.

7. A vehicle, a cotton picker having a spindle-supporting frame movable in all directions independently of the vehicle, spindle bearings in said frame, a reversible spindle, a plurality of brushes each pivotally supported from the spindle and turning on their axes independently of the direction of the rotation of said spindle, a handle to direct the spindle, means to turn the brushes on said spindle, and flexible connecting means between said spindle and vehicle to rotate the brush-supporting spindle.

8. A spindle-supporting frame having the handle and nose, a spindle, a plurality of oscillating brushes supported by and parallel to the spindle, and a sack co-extensive with the brushes, said handle constituting the sole support of the plurality of brushes and the sack, whereby they may be freely thrust in any direction and cotton from the several brushes deposited directly into the sack.

9. A vehicle, the spindle-supporting frame having at one end a handle independent of the vehicle for its manipulation and at the other a pointed nose, a spindle rotatable within the frame, means for rotating it, a plurality of cotton-picking brushes each pivotally supported on the spindle, and a cotton receiver connected to the frame and situated directly under the several brushes to receive cotton dropped directly from the several brushes.

10. The spindle-supporting frame having at one end a handle for its manipulation and at the other a pointed nose, a rotatable brush-supporting spindle situated within the frame, a plurality of oscillating cotton-picking brushes turning separately in bearings supported on the spindle and parallel thereto, a cotton receiver connected to the frame lengthwise thereof and under the several brushes, and means to convey the cotton from the receiver, said handle constituting the sole support of the frame.

11. A spindle-supporting frame, a reversible brush-supporting spindle, means for reversing the spindle at will, said supporting frame being movable at will in all directions, and a handle, said handle constituting the sole support of the spindle and frame, combined with a plurality of pivoted oscillating brushes parallel to the spindle, mechanism to automatically reverse the brushes on the reversible supporting-spindle to pick cotton whatever the direction of rotation of said spindle.

12. A reversible rotatable brush support, combined with a plurality of pivoted brushes, said brushes being operative independently of the direction of rotation of their support, and devices for discharging cotton from the brushes situated on opposite sides of said support, parallel to and co-acting with the brushes lengthwise thereof.

13. A reversibly rotatable brush support, combined with brushes operative independently of the direction of rotation of their support devices for discharging the cotton from the brushes, said devices being situated on opposite sides of said support, and a sack connected to the support.

14. The spindle frame having two compartments, the brushes, the stripping devices, both brushes and strippers being supported within one compartment, spindle-driving and reversing gear situated in the other compartment, and the spindle extending through both compartments.

15. The open-topped spindle frame having the nose and handle and independently movable in all directions, the spindle, the several brushes independently supported from the spindle and surrounding the same, both spindle and brushes being within the sides of the frame, combined with a cotton-conveying tube connected to the frame in front of the handle, said nose being approximately conical with a base transversely co-extensive with the frame.

16. In a cotton picking device, the combination of a spindle-supporting frame, a frame handle for directing the same, a frame support, flexible connections suspending the frame from the support, a reversible spindle, devices for picking cotton situated on each side of a plane passing through the spindle axis in practically parallel lines, means for actuating the picking devices, and means for reversing them, whereby cotton can be conveniently picked on opposite sides of said plane whether the spindle be reversed or not.

17. In combination, a wagon, a picker-brush-supporting-frame, a plurality of picker brushes, a flexible picker-operating shaft, a cotton collecting tube, a detachable sack, said sack being attached to the frame and co-extensive with the brushes lengthwise thereof, and a handle to carry the frame, brushes, sack, an end of the shaft and one end of the tube.

18. In combination with the frame, a plurality of independently pivoted and independently reversible picker brushes, and a detachable sack, said sack being co-extensive with the brushes lengthwise thereof and enlarged in capacity toward its delivery end for free and continuous discharge of cotton.

19. The combination of a vehicle, a motor, and a picking device comprising a rotatable spindle, with a flexible cotton-collecting tube, a separate flexible picker-driving shaft, means to keep the tube and shaft adjacent each other, a spindle-supporting frame, a handle in line with the frame to support and manipulate said picker device and adapted to thrust the picker endwise at any angle and from a point in any plane within the reach of the tube, said tube and shaft being when in operation pendent from the handle, and means for supporting the outer ends of the tube and shaft from the person of the manipulator, said means connecting with the tube and shaft between the picking devices and motor.

20. The combination of a vehicle, a spindle-supporting frame, flexible connections between the vehicle and frame, a reversible spindle, a plurality of independently acting pivoted brushes separately supported on and parallel to the spindle and surrounding the same, and a frame handle.

21. The combination of a horizontal reversible brush-supporting spindle, a plurality of reversible brushes on said support, means for simultaneously holding a part of the brushes on the upper side of said spindle in operative situation to pick cotton both before and after the reversal of the spindle and for automatically reversing them upon reversing the spindle, said spindle being reversible at will and independently of its support, and means to receive picked cotton from either side of the picker.

22. In a cotton picker, a spindle-supporting frame, a rotatable brush-supporting spindle, devices for rotating the spindle, brushes pivotally supported from the spindle, a device for reversing the direction of rotation, and a receptacle for receiving picked cotton, said brushes being operative for picking and said receptacle being operative for receiving picked cotton whatever be the direction of rotation.

23. In a cotton picker, a spindle-supporting frame, a frame support, flexible connections suspending the frame from its support, a brush-supporting spindle, devices for rotating the spindle, and mechanism for reversing the direction of rotation at will.

In testimony whereof, I have signed this specification in the presence of two subscribing witnesses.

GILBERT F. GREENE.

Witnesses:
 ELIZABETH L. MACFATE,
 BENJ. R. CATLIN.